(12) United States Patent
Tæstensen et al.

(10) Patent No.: US 11,807,962 B2
(45) Date of Patent: Nov. 7, 2023

(54) KNITTED UPPER FOR A SHOE WITH A MOLDED SOLE AND A SHOE

(71) Applicant: ECCO SKO A/S, Bredebro (DK)

(72) Inventors: Niki Tæstensen, Hamburg (DE); Savino Paulo Bove, Biel (CH)

(73) Assignee: ECCO Sko A/S, Bredebro (DK)

( * ) Notice: Subject to any disclaimer, the term of this patent is extended or adjusted under 35 U.S.C. 154(b) by 64 days.

(21) Appl. No.: 17/193,789

(22) Filed: Mar. 5, 2021

(65) Prior Publication Data

US 2021/0189614 A1 Jun. 24, 2021

Related U.S. Application Data

(63) Continuation of application No. 15/773,656, filed as application No. PCT/EP2016/076638 on Nov. 4, 2016, now Pat. No. 10,954,613.

(30) Foreign Application Priority Data

Nov. 4, 2015 (EP) ..................................... 15193017

(51) Int. Cl.
*D04B 1/10* (2006.01)
*A43B 23/02* (2006.01)
*B29D 35/06* (2010.01)

(52) U.S. Cl.
CPC .......... *D04B 1/106* (2013.01); *A43B 23/0215* (2013.01); *A43B 23/0245* (2013.01);
(Continued)

(58) Field of Classification Search
CPC .......... D04B 1/102; D04B 1/24; D04B 1/106; A43B 1/04; B29D 35/064; B29D 35/068
See application file for complete search history.

(56) References Cited

U.S. PATENT DOCUMENTS

| | | | |
|---|---|---|---|
| 4,447,967 A | 5/1984 | Zaino | |
| 4,785,558 A | 11/1988 | Shiomura | |
| 5,345,638 A | 9/1994 | Nishida | |
| 6,782,642 B2 * | 8/2004 | Knoche | A43B 13/26 36/129 |

(Continued)

FOREIGN PATENT DOCUMENTS

| | | |
|---|---|---|
| EP | 2594146 A1 | 5/2013 |
| EP | 2649898 A1 | 10/2013 |

(Continued)

OTHER PUBLICATIONS

International Preliminary Report on Patentability for corresponding application PCT/EP2016/076638 filed Nov. 4, 2016; dated Feb. 16, 2018 (9 pages).

(Continued)

*Primary Examiner* — Danny Worrell
(74) *Attorney, Agent, or Firm* — Lee & Hayes, P.C.

(57) ABSTRACT

An upper for a shoe and a shoe including an upper and a sole that is connected to the upper may be provided. In one implementation, an upper for a shoe may be provided, the shoe including the upper and a sole connected to a lower edge of the upper via injection molding. The upper may include a first knitted area having a first stitch density, wherein a portion of the first knitted area may be located at the lower edge of the upper and may include a first meltable material having a first melting temperature. The first meltable material may be melted prior to or during the connection of the sole to the upper and may limit the flow of molding material through a melted area of the upper.

23 Claims, 3 Drawing Sheets

(52) U.S. Cl.
CPC ........ *A43B 23/0265* (2013.01); *B29D 35/061* (2013.01); *B29D 35/068* (2013.01); *D10B 2501/043* (2013.01)

(56) References Cited

U.S. PATENT DOCUMENTS

| | | |
|---|---|---|
| 2003/0227105 A1 | 12/2003 | Paratore et al. |
| 2005/0193592 A1 | 9/2005 | Dua et al. |
| 2010/0154256 A1 | 6/2010 | Dua |
| 2012/0233882 A1 | 9/2012 | Huffa et al. |
| 2012/0255201 A1 | 10/2012 | Little |
| 2015/0289579 A1 | 10/2015 | Meir |
| 2018/0325215 A1 | 11/2018 | Tæstensen et al. |
| 2019/0037966 A1 | 2/2019 | Aceves Tinajero et al. |
| 2019/0350303 A1 | 11/2019 | Huffa et al. |
| 2019/0365049 A1 | 12/2019 | Verfl |
| 2020/0070455 A1 | 3/2020 | Calle |

FOREIGN PATENT DOCUMENTS

| | | |
|---|---|---|
| EP | 2792261 A1 | 10/2014 |
| EP | 2910873 A1 | 8/2015 |

OTHER PUBLICATIONS

International Search Report for corresponding application PCT/EP2016/076638 filed Nov. 4, 2016; dated Jan. 26, 2017 (5 pages).
Written Opinion for corresponding application PCT/EP2016/076638 filed Nov. 4, 2016; dated Jan. 26, 2017 (8 pages).

* cited by examiner

KNITTED UPPER FOR A SHOE WITH A MOLDED SOLE AND A SHOE

CROSS-REFERENCE TO RELATED PATENT APPLICATIONS

This application is a continuation of U.S. patent application Ser. No. 15/773,656, filed May 4, 2018, which is a U.S. national stage entry under 35 U.S.C. § 371 of International Application No. PCT/EP2016/076638, filed Nov. 4, 2016, which claims the benefit and priority of prior European Patent Application No. 15193017.9, filed Nov. 4, 2015, all of which are hereby incorporated by reference in their entirety.

TECHNICAL FIELD

The current invention relates to an upper for a shoe with a molded sole and a shoe comprising a knitted upper with a molded sole.

BACKGROUND

When making shoes, two main elements influence the final appearance of the shoe and these elements are comfort and design.

A shoe comprises the following elements:

Sole—All shoes have a sole, which is the bottom of a shoe that is in contact with the ground and may consist of an insole, midsole, and an outsole. The insole is the interior bottom of a shoe that sits directly beneath the foot under the footbed (also known as sock liner). The outsole is the layer in direct contact with the ground. Dress shoes often have leather or resin rubber outsoles; casual or work-oriented shoes have outsoles made of natural rubber or a synthetic material like polyurethane. The outsole may comprise a single piece, or may be an assembly of separate pieces, often of different materials. On some shoes, the heel of the sole has a rubber plate for durability and traction, while the front is leather for style. Specialized shoes will often have modifications on this design: athletic or so-called cleated shoes like soccer, rugby, baseball and golf shoes have spikes embedded in the outsole to improve traction. The midsole is the layer in between the outsole and the insole, typically there for shock absorption. Some types of shoes, like running shoes, have additional material for shock absorption.

Upper—The upper helps hold the shoe onto the foot. In the simplest cases, such as sandals or flip-flops, this may be nothing more than a few straps for holding the sole in place. Closed footwear, such as boots, trainers and most men's shoes, will have a more complex upper. This part is often decorated or is made in a certain style to look attractive. The upper is connected to the sole eg by a strip of leather, rubber, or plastic that is stitched between it and the sole, known as a welt. Most uppers have a mechanism, such as laces, straps with buckles, zippers, elastic, Velcro straps, buttons, or snaps, for tightening the upper on the foot. Usually, uppers with laces have a tongue that helps seal the laced opening and protect the foot from abrasion by the laces. Uppers with laces also have eyelets or hooks to make it easier to tighten and loosen the laces and to prevent the lace from tearing through the upper material.

The upper can be made from different types of material, such as eg leather or fabric.

It is also known to make knitted uppers and a problem with such knitted uppers is that it can be difficult to obtain the same material strength and shape as can be obtained from other materials. A further problem is that when making shoes where the soles are to be molded onto the upper, it can be difficult to obtain a strong connection between the knitted upper and the molded sole. In prior art, this problem is typically solved by adding a strengthening rim to the edge between the molded sole and the knitted upper. Other problems when combining molded soles with a knitted upper may relate to:

Obtaining a stable and strong connection between the sole and the upper,

Ensuring that the upper can withstand the forces used when closing the lacing system, Obtaining different properties of the material in different areas of the upper.

BRIEF SUMMARY

The disclosure provides an upper for a shoe, wherein said shoe comprises said upper and a sole connected to the lower edge of said upper via injection molding, said upper comprising knitted areas with a low stitch density providing ventilation through the upper, characterized in that, said lower edge is knitted with a high stitch density, thereby limiting the flow of molding material through the edge of the knitted upper.

Thereby, a good and stable contact can be obtained when molding a sole to the upper and it is not necessary to use a strengthening rim or reinforcement elements to secure the connection. The high stitch density should be sufficiently high to at least minimize the amount of sole material that can pass through the edge during molding. Of cause, this also depends on the texture of the material used for molding the sole, where a thin texture can pass through higher stitch densities than a thick texture.

When knitting the upper, a flat machine may be used, where the thread has a thickness around 150 D/48 F and the needle for stitching is 10 GG and 12 GG needles. Typically, the knitted upper would be made from 4-thread knitting.

In an embodiment, the higher stitch density at the lower edge has a stitch density above 5-15 stitches pr. inch, preferably, the stitch density may be between 10-12 stitches pr. inch.

Thereby, tests have proven that when using the common sole materials for molding the sole, the lower knitted edge blocks sole material from flowing through the lower edge and further a good contact surface is obtained.

In an embodiment, the edge adjacent to the lower edge and thereby adjacent to a sole line, when the sole is knitted with a higher stitch density.

The high knitting density adjacent to the sole line ensures that stretching of the knitted upper is limited at the edge adjacent to the sole line, which results in a more robust shoe.

In an embodiment, at least said knitted lower edge comprises polyester. This may eg be integrated in some of the thread used for knitting. Thereby, the edge of the knitted upper comprises material corresponding to the material for molding the sole, whereby a better connection is obtained between the molded sole and the upper.

In an embodiment, said at least knitted lower edge comprises an acrylic material. This may eg be integrated in some of the threads used for knitting and thereby when heating the upper, the acrylic material melts ensuring that openings in the lower edge knitting are further reduced. The heating of the acrylic material may eg be performed in a preheating process, where the entire knitted upper is heated. As an alternative, the acrylic material will melt when molding the sole onto the edge of the knitted upper, said melding binding the polyester in the knitted upper together and further enhancing connection between the upper edge and the molded sole.

Therefore, a process for producing the knitted upper may be to:
1. Knit the upper (eg on a knitting machine) from threads having selected materials, where some of these threads may comprise acrylic material and/or polyester,
2. Perform a preheating of the knitted upper, thereby heating the upper to a temperature that melts the acrylic material in the upper,
3. Mold a sole onto the preheated knitted upper, eg by injection molding.

A further advantage of having polyester and acrylic in the upper is that in this way the shape of the upper can be maintained.

The combination of edge knitting with high stitch density and having acrylic material in the thread used for knitting ensures that the entire upper can be knitted in one piece, the stitch density of the upper being high at the edge of the upper. Thereby, a lower stitch density away from the edge ensures that the upper away from the edge is breathable even though the acrylic material melts, whereas the high stitch density at the edge combined with the melting of the acrylic material makes the edge a continuous surface having no or at least only very small holes.

In an embodiment, said acrylic material has a melting temperature above 160 degrees Celsius.

In the above, the acrylic material is described as the melting material in the knitted upper threads. Of cause, other materials melting at similar temperatures may also be used.

In an embodiment, the entire upper is knitted.

Thereby, a special design can be obtained and a shoe having an airflow through the knitting is made, thereby increasing the comfort of wearing a shoe.

In an embodiment, the knitted areas on said upper comprise knitted areas with different stitch densities to ensure specific stretch properties of the upper.

Thereby, by changing the stitch densities along the upper, specific properties of the shoe can be obtained eg depending on the ergonomics of the user of the shoe or the type of activities that the shoe are to be used for.

In an embodiment, the upper comprises lacing holes for receiving a shoe lace, wherein said lacing holes are surrounded by a knitting having a high stitch density.

Thereby, the holes can withstand the forces used when closing the lacing system by pulling of the laces.

In an embodiment, the upper comprises lacing holes for receiving a shoe lace, wherein the upper comprises lacing enforcement knitting areas having a high stitch density connecting the lacing holes and the lower edge to be connected to the shoe sole.

Thereby, the connection between the lacing holes and the sole is enforced, ensuring that the knitted upper and its connection to the sole can withstand the forces used when closing the lacing system by pulling in the laces.

In an embodiment, said lacing enforcement knitting areas are shaped as lines connecting the eyelet and the lower edge of the upper.

Thereby, the lacing enforcement can be structured in specific directions according to the direction of the enforcement knitting areas.

In an embodiment, said lacing enforcement knitting areas are shaped as areas between the eyelet and the lower edge of the upper.

Thereby, a stronger support surface is obtained between the foot and the areas of these specific areas, eg a toe area or a heel area.

In an embodiment, said upper comprises multiple layers of material, wherein one of said layers is knitted.

Thereby, even if the density of the knitted layer is low eg due to specific designs, then the other layer of material is added to ensure that the shape and strength of the shoe is maintained.

The present invention further relates to a shoe, wherein said shoe comprises an upper according to the above.

BRIEF DESCRIPTION OF THE DRAWINGS

In the following, the invention will be described in detail with reference to the embodiments shown in the enclosed figures. It should be emphasized that the embodiments shown are used for example purposes only and should not be used to limit the scope of the invention.

The following figures are used to describe embodiments of the present invention, wherein.

DETAILED DESCRIPTION

When knitting eg using knitting machines, different knitting technics imply different knitting structures and in these structures stitch densities can vary. A high density indicates a high number of stitches pr. square centimeter (high total number of needle loops in a square area) and a low density indicates a low number of stitches pr. square centimeter (low total number of needle loops in a square area). Knitted parts having a high stitch density have a more closed structure, whereas the low density knitting provides an open structure. Throughout this document reference is made to high and low stitch densities, where the high density has/may have a stitch density above 8 stitches pr. inch and more specifically between 10-12 stitches pr. Inch.

Figure 1:
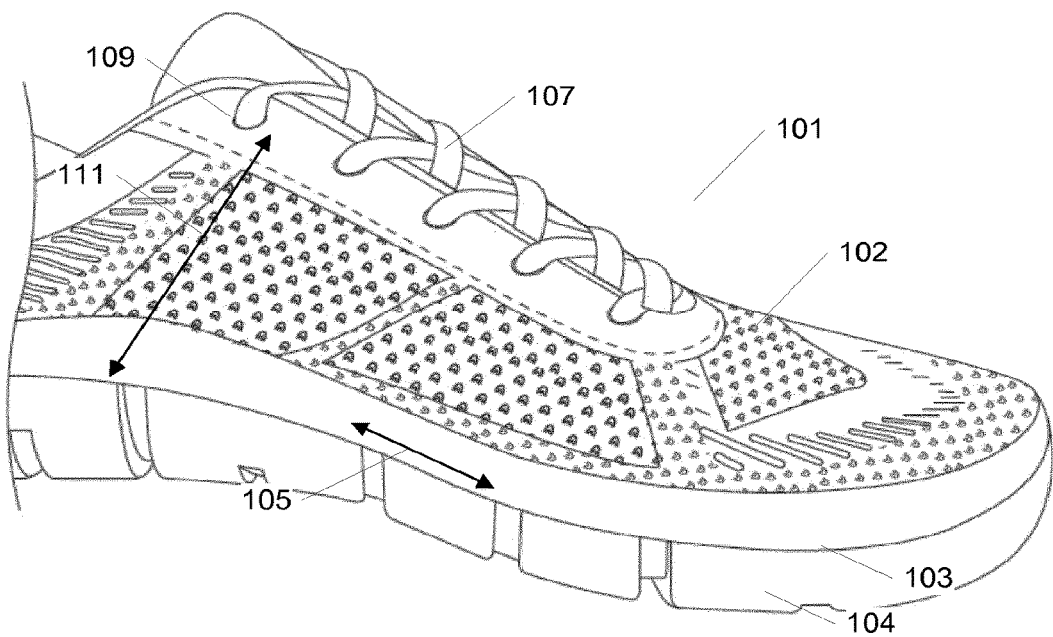
FIG. 1 illustrates a prior art shoe upper where different zones are marked.

In FIG. 1, a prior art shoe 101 is illustrated and the different zones are marked and named according to the following:

Upper 102 and sole 104,
Lower edge 103 of upper connected to sole,
Sole line area 105 being the area adjacent to the sole line,
Closing mechanism 107 of upper comprising lacing holes 109 for receiving shoelaces,
Area 111 between the lacing area and the sole.

In the figure, a strengthening rim has been added to the area between the knitted upper and the sole to ensure a good and strong connection between the upper and the sole.

Figure 2:
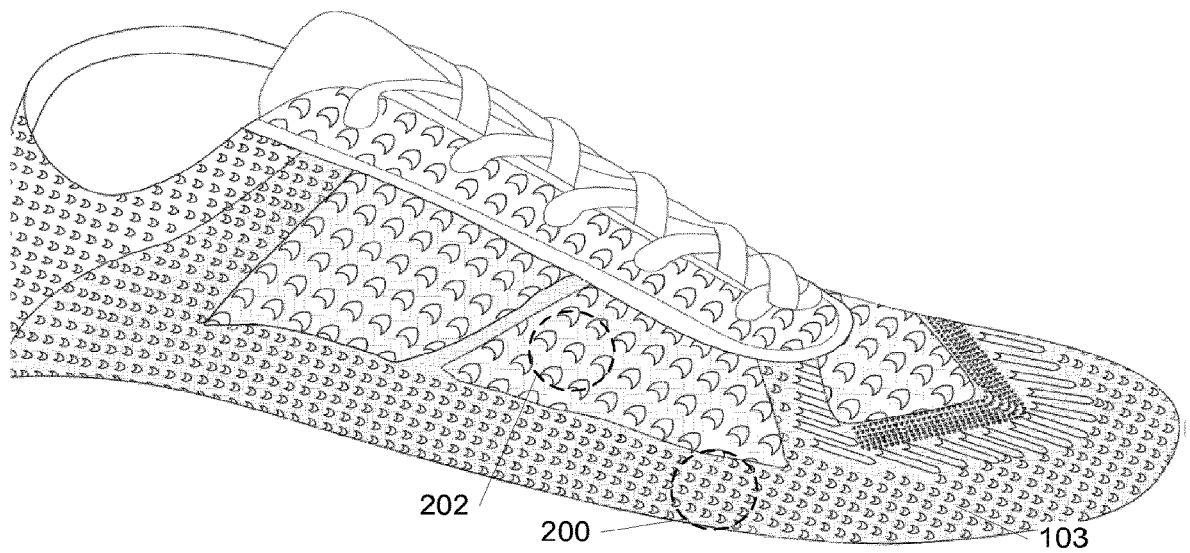
FIG. 2 illustrates a knitted upper according to the present invention, wherein the lower edge is knitted with a high stitch density.

In FIG. 2, a knitted upper according to the present invention is illustrated, wherein the lower edge 103 is knitted with a higher stitch density 200. The high knitting density at the lower edge ensures that a quite closed knitting structure is obtained at the edge. Thereby, the high stitch density ensures that the sole material, when molding the sole to the upper, cannot pass through the lower edge. Thereby, a good contact is obtained when connecting a sole to the lower edge of the knitted upper. In the example, there are further areas of the upper where the stitch density is lower than 202. Where high stitch density results in the knitted material being more stiff, dense and strong, then a lower stitch density results in a more flexible and open structure.

When molding the sole to the upper, the sole is connected to overlap the lower edge (eg lower than 2-10 mm of the knitted) of the upper and to avoid or at least to minimize the amount of sole material that flows through the edge of the upper. This part should be knitted with a high stitch density. Alternatively, at least a part of the lower edge onto which the sole is molded has a high stitch density. In FIG. 2, large half-moon like elements are used to illustrate a low stitch density, whereas small half-moon shaped elements are used to illustrate a high stitch density. In the part of the upper away from the lower edge, different patterns are positioned on the upper, these patterns simply being examples. Further, in the example, the entire heel portion is illustrated having a high stitch structure. Again, this is just an example, but at least part of the lower edge of the upper being connected to the sole should have a high stitch density.

The types of thread used to make a knitted upper may be any type of yearn suitable for an upper and typically, the upper may be knitted by a knitting machine based on a predefined upper design.

Figure 3:
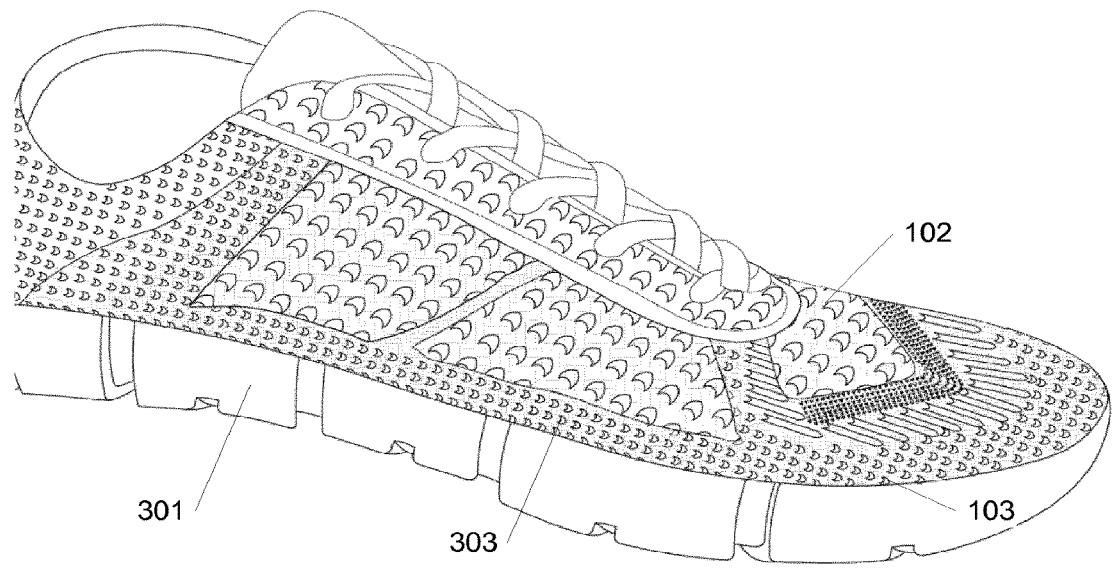
FIG. 3 illustrates a shoe sole, which have been mounted to the upper of FIG. 2.

In FIG. 3, a shoe is illustrated, where a shoe sole 301 has been molded to the upper 102. The sole is molded to the lower edge of the upper, whereby the sole covers and overlaps part of the lower edge. The high stitch density of the lower edge ensures that the edge has a dense structure, thereby obtaining a good contact when molding a sole to the edge. Further, in this example, the lower edge 303 also has a high stitch density at the sole line area adjacent to the sole line 103. Thereby, part of the lower edge 303 adjacent to the upper has the strong properties of a high stitch density. Thereby, the knitted upper will not easily be ripped of the sole due to forces used when lacing the shoe. In the illustrated embodiment, the high stitch density is present in a specific area at the edge and in the example; this edge is followed by areas of the upper having a significantly lower stitch. Alternatively, the stitch density may gradually decrease away from the sole line.

Figure 4:
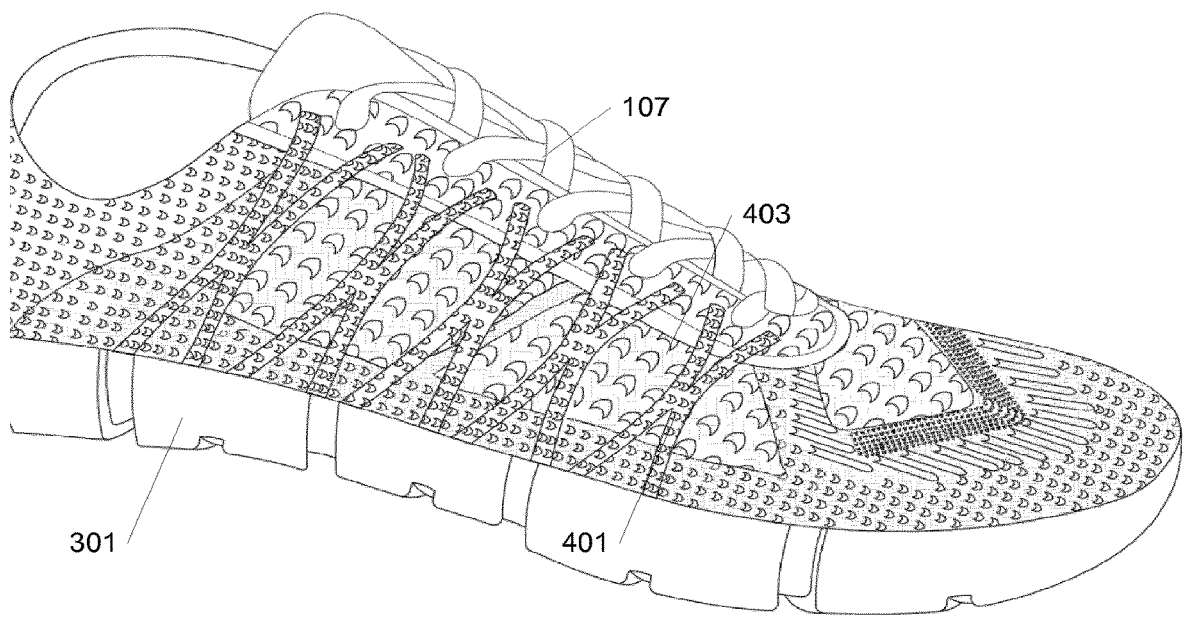
FIG. 4 illustrates the area between the lacing area and the sole having segments with increased stitch density.

In FIG. 4, an embodiment is illustrated where elongated areas of high stitch density are present in lines 401 between the closing mechanism 107 and the sole. The areas 403 having a low stitch density provide areas in the upper having a more flexible and open structure. The lines 401 provide stability to the upper and further ensures a strong connection between the lacing area and the sole, where the lower end of the lines are connected to the sole material. In FIG. 4, the lines are illustrated having a specific shape; other shapes may of cause be possible depending on required properties and design. Alternatively, it does not have to be a continuous line of high stitch density, but also segments of high stitch density may be positioned between the lacing area and the sole, to increase the strength of the upper.

Figure 5:
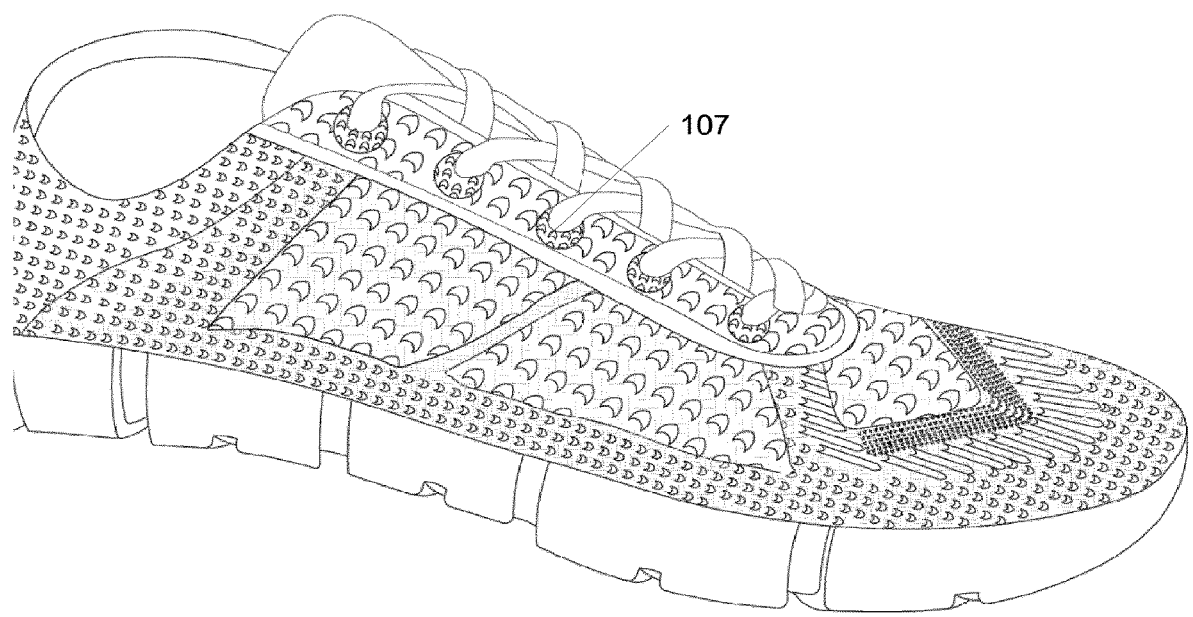
FIG. 5 illustrates the lacing area of the upper illustrating the density increase around the lacing holes.

In FIG. 5, an embodiment is illustrated where the upper has a closing mechanism with lacings and where the area around the lacing holes is stitched with a high stitch density. In the illustrated example, the area is circular, but as an alternative, the entire closing mechanism area may be stitched with a high stitch density.

The invention claimed is:

1. An upper for a shoe, wherein the shoe includes the upper and a sole connected to a lower edge of the upper via injection molding, the upper comprising:
    a knitted area having a stitch density,
    wherein a portion of the knitted area is located at the lower edge of the upper, the portion of the knitted area including at least one thread and a meltable material having a melting temperature, the meltable material being integrated in the at least one thread,
    wherein the meltable material is melted prior to or during the connection of the sole to the upper, and
    wherein the meltable material limits a flow of molding material through a melted area of the upper.

2. The upper according to claim 1, wherein the knitted area is a first knitted area, and
    wherein the upper further comprises a second knitted area having a second stitch density.

3. The upper according to claim 2, wherein the first stitch density is higher than the second stitch density.

4. The upper according to claim 1, wherein the stitch density is a high stitch density above 5 stitches per inch.

5. The upper according to claim 4, wherein the stitch density is above 10 stitches per inch.

6. The upper according to claim 4, wherein the lower edge of the upper has the stitch density.

7. The upper according to claim 1, wherein the meltable material defines a continuous surface having no holes or having holes that are impenetrable by the molding material.

8. The upper according to claim 1, wherein the meltable material reduces a size of openings in a knitted material of the knitted area.

9. The upper according to claim 1, wherein the meltable material closes off openings in a knitted material of the knitted area.

10. The upper according to claim 1, wherein the lower edge of the upper comprises a polyester material.

11. The upper according to claim 10, wherein the polyester material is compatible with an injection molding material of the sole.

12. The upper according to claim 1, wherein the meltable material comprises an acrylic material.

13. The upper according to claim 1, wherein the meltable material has a melting temperature above 160 degrees Celsius.

14. The upper according to claim 1, wherein the melted area of the upper is adjacent to the lower edge of the upper and thereby adjacent to a sole line when the sole is knitted with a higher stitch density.

15. The upper according to claim 1, wherein an entirety of the upper is knitted.

16. The upper according to claim 15, wherein the knitted area is one of a plurality of knitted areas,
    wherein the stitch density is one of a plurality of stitch densities, and
    wherein the plurality of knitted areas include different stitch densities of the plurality of stitch densities, respectively, to ensure specific stretch properties of the upper.

17. The upper according to claim 1, wherein the sole is formed by injection molding the molding material directly to the lower edge of the upper.

18. The upper according to claim 1, wherein the upper further comprises lacing holes for receiving a shoe lace, and
    wherein the lacing holes are surrounded by a knitting having a high stitch density above 5 stitches per inch.

19. The upper according to claim 1, wherein the upper further comprises:
lacing holes for receiving at least one shoe lace, and
lacing enforcement knitting areas having a high stitch density above 5 stitches per inch connecting the lacing holes and the lower edge to be connected to the sole.

20. The upper according to claim 19, wherein the lacing enforcement knitting areas are shaped as lines connecting at least one eyelet and the lower edge of the upper.

21. The upper according to claim 19, wherein the lacing enforcement knitting areas are shaped as areas between at least one eyelet and the lower edge of the upper.

22. The upper according to claim 1, wherein the upper further comprises multiple layers of material, and
wherein one of the layers is knitted.

23. A shoe comprising:
an upper comprising a knitted area with a stitch density, wherein a portion of the knitted area is located at a lower edge of the upper, the portion of the knitted area including at least one thread and a meltable material having a melting temperature, wherein the first meltable material is integrated in said at least one thread and limits a flow of molding material through a melted area of the upper; and
a sole that is connected to the melted area of the upper, wherein the meltable material is melted prior to or during the connection of the sole to the upper.

* * * * *